UNITED STATES PATENT OFFICE.

ALBERT ROLLHEUSER, OF MILWAUKEE, WISCONSIN.

MALTED FOOD COMPOUND.

SPECIFICATION forming part of Letters Patent No. 596,945, dated January 4, 1898.

Application filed May 28, 1897. Serial No. 638,549. (No specimens.)

*To all whom it may concern:*

Be it known that I, ALBERT ROLLHEUSER, of Milwaukee, in the county of Milwaukee and State of Wisconsin, have invented certain new and useful Improvements in Malted Food Compounds; and I do hereby declare that the following is a full, clear, and exact description of the invention, which will enable others skilled in the art to which it pertains to make and use the same.

The object of my invention is to produce a wholesome, nutritious, and palatable food in a condensed and convenient form for use.

It consists of the product and the method of making it hereinafter particularly described, and pointed out in the claims.

In the preparation of my improved food selected oats or other cereals are soaked in cold water from twenty-four to thirty-six hours and then spread out and subjected to the usual malting process. When germinated, the malt is dried, ground, and macerated in cold water, sufficient water being used to make a thick mash. The white of egg, either with or without fennel-seed, is then added to the mash, and the temperature of the mixture is raised slowly from about 60° to 170° Fahrenheit or thereabout, being kept for about two hours between about 100° and 135° Fahrenheit until the white of the egg is peptonized and the starch of the grain converted into sugar and dextrine by the ferments contained in the malt. The mixture is then strained or filtered to remove the oat-hulls or other refuse matter. Fresh sterilized cow's milk is then added to the filtered liquor, and the resulting mixture is evaporated to dryness in a vacuum, granulated or powdered, and put up in cans, bottles, or other hermetically-sealed packages, in which it will keep for a long time without deterioration, out of contact with the air.

The proportions of the above-mentioned ingredients found to produce the most satisfactory results and a very palatable food are about fifty per cent. of oats or other similar grain, thirty per cent. of milk, fifteen per cent. of white of egg, and five per cent. of fennel-seed; but the fennel-seed may be altogether omitted and the above proportions varied and still a very satisfactory product will be obtained.

My improved malted food is particularly well adapted for feeding infants, invalids, or persons with weak stomachs or impaired digestion.

The principal objection against the use of cow's milk for feeding infants is due to the fact that the casein of cow's milk, unlike the casein of mother's milk, is very liable to precipitation in the infant's stomach in the form of large flakes, causing disturbance of the digestive organs. This objectionable property of cow's milk is very materially reduced by the white of egg contained in my preparation, since it acts as an emulsifier and tends to keep the casein in a finely-divided state.

I claim—

1. A dry, granulated or powdered food product composed of malted grain, milk and white of egg, substantially as and for the purposes set forth.

2. A dry, granulated or powdered food composed of malted grain, the white of egg which has been peptonized at a low or moderate temperature by the ferments contained in the malt, and sterilized milk, substantially as and for the purposes set forth.

3. The process of making the herein-described food preparation which consists in macerating malted grain in water, adding thereto the white of egg, slowly raising the mixture thus formed to a moderate temperature until the white of the egg is peptonized and the starch of the grain is converted into sugar and dextrine by ferments contained in the malt; then straining or filtering the mash to remove refuse matter, adding milk to the filtered liquor and finally evaporating the resulting mixture to dryness *in vacuo* and grinding or granulating the same, substantially as and for the purposes set forth.

In testimony that I claim the foregoing as my own I affix my signature in presence of two witnesses.

ALBERT ROLLHEUSER.

Witnesses:
CHAS. L. GOSS,
M. L. EMERY.